United States Patent
Gerst et al.

(10) Patent No.: US 6,254,985 B1
(45) Date of Patent: Jul. 3, 2001

(54) PRESSURE-SENSITIVE ADHESIVES

(75) Inventors: Matthias Gerst, Neustadt; Gerhard Auchter, Bad Dürkheim; Alexander Zettl, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/289,642

(22) Filed: Apr. 12, 1999

(30) Foreign Application Priority Data

Apr. 24, 1998 (DE) .............................. 198 18 394

(51) Int. Cl.$^7$ .............................. B32B 15/04; B32B 7/12
(52) U.S. Cl. ........................... 428/355 EN; 428/355 AC
(58) Field of Search ...................... 428/355 EN, 355 AC

(56) References Cited

U.S. PATENT DOCUMENTS

| 3,280,217 | * 10/1966 | Lader et al. ................. 260/844 |
| 4,204,023 | 5/1980 | Witt . |
| 5,405,693 | 4/1995 | Dittrich et al. . |

FOREIGN PATENT DOCUMENTS

| 196 49 383 | 6/1998 | (DE) . |
| 0 625 557 A1 | 11/1994 | (EP) . |
| 01075577 | * 3/1989 | (JP) . |
| WO 98/06763 | 2/1998 | (WO) . |
| WO 98/23656 | 6/1998 | (WO) . |

* cited by examiner

Primary Examiner—Elizabeth M. Cole
Assistant Examiner—Frederick G. Dean
(74) Attorney, Agent, or Firm—Oblon, Spivak, McClelland, Maier & Neustadt, P.C.

(57) ABSTRACT

Pressure-sensitive adhesives comprising an aqueous polymer dispersion wherein the polymer is composed of

| from 60 to 95% by weight | of a mixture comprising at least one $C_4$-alkyl acrylate and at least one $C_6$–$C_{12}$-alkyl acrylate (monomers a) |
| from 5 to 30% by weight | of ethylenically unsaturated compounds having a glass transition temperature of above 0° C. and containing no functional groups other than the ethylenically unsaturated group (monomers b), |
| from 0 to 10% by weight | of ethylenically unsaturated compounds having at least one acid group or acid anhydride group (monomers c), |
| from 0 to 20% by weight | of further ethylenically unsaturated compounds (monomers d), | the weight percentages being based on the polymer and the polymer dispersion comprising an emulsifier consisting to the extent of at least 5% by weight of aromatic carbon atoms (and called aromatic emulsifier for short) or an emulsifier mixture consisting to the extent of at least 10% by weight of an aromatic emulsifier.

10 Claims, No Drawings

PRESSURE-SENSITIVE ADHESIVES

Pressure-sensitive adhesives comprising an aqueous polymer dispersion wherein the polymer is composed of

| | |
|---|---|
| from 60 to 95% by weight | of a mixture comprising at least one $C_4$-alkyl acrylate and at least one $C_6$–$C_{12}$-alkyl acrylate (monomers a) |
| from 5 to 30% by weight | of ethylenically unsaturated compounds having a glass transition temperature of above 0° C. and containing no functional groups other than the ethylenically unsaturated group (monomers b), |
| from 0 to 10% by weight | of ethylenically unsaturated compounds having at least one acid group or acid anhydride group (monomers c), |
| from 0 to 20% by weight | of further ethylenically unsaturated compounds (monomers d), | the weight percentages being based on the polymer and the polymer dispersion comprising an emulsifier consisting to the extent of at least 5% by weight of aromatic carbon atoms (and called aromatic emulsifier for short) or an emulsifier mixture consisting to the extent of at least 10% by weight of an aromatic emulsifier.

Pressure-sensitive adhesives (PSAs) form a permanently tacky film which adheres to a very wide variety of surfaces even—as their name suggests—under slight pressure at room temperature. Pressure-sensitive adhesives are used to produce self-adhesive products such as labels, tapes and films. Products of this kind are very easy to use and make it possible to work rapidly when bonding. In contrast to contact adhesive compositions, no ventilation times are required. Moreover, there is no "open time" within which the adhesive bond must be made. The quality of a self-adhesive article depends essentially on whether the cohesion (internal strength of the film of adhesive) and its adhesion (to the surface that is to be bonded) are in tune with one another in accordance with the application.

In the case of pressure-sensitive adhesives for films, adhesive tapes or labels, in particular, the level of cohesion must be sufficient for no stringing and no emergence of glue at the edges to occur in the course of stamping and cutting, since otherwise the cutting tools become soiled and the cut faces sticky. At the same time, the adhesion should be at a high level in order to provide good sticking on the substrate that is to be bonded.

In general, it is impossible to optimize adhesion and cohesion independently of one another. There is a desire for measures which either lift the level of both properties, or at least maintain one property unchanged while improving the other.

Adhesives, including pressure-sensitive adhesives, based on polyacrylate dispersions are known from EP-A-625 557 or PCT/EP 97/04102. Copolymers of this kind still do not have the desired level of adhesion and cohesion or the desired ratio of the one to the other. The unpublished PCT/EP 97/06424 discloses laminating adhesives based on a copolymer including $C_4$ and $C_8$ alkyl acrylates.

It is an object of the present invention to provide pressure-sensitive adhesives having improved adhesion and/or cohesion.

We have found that this object is achieved by the pressure-sensitive adhesives defined above.

The polymer of the aqueous polymer dispersion is composed of the monomers a) to d) defined at the outset.

The monomers a) comprise a mixture of at least one $C_4$-alkyl acrylate and at least one $C_6$–$C_{12}$-alkyl acrylate.

The preferred $C_4$-alkyl acrylate is n-butyl acrylate.

Suitable examples of $C_6$–$C_{12}$-alkyl acrylate are n-hexyl, 2-ethylhexyl, octyl, decyl or dodecyl acrylate.

Preference is given to $C_8$-alkyl acrylates, especially 2-ethylhexyl acrylate.

The proportion of the $C_4$-alkyl acrylate is preferably from 15 to 85% by weight, more preferably from 20 to 80% by weight and, with very particular preference, from 30 to 70% by weight, and that of the $C_6$–$C_{12}$-alkyl acrylates is preferably from 85 to 15% by weight, more preferably from 20 to 80% by weight and, with very particular preference, from 30 to 70% by weight, the weight percentages being based in each case on the overall amount of the monomers a).

Monomers a) have a glass transition temperature of below 0° C.

Monomers b) comprise monomers which contain no functional group other than the ethylenically unsaturated group, i.e. no hydroxyl, acid, acid anhydride, nitro or primary, secondary or tertiary amino groups, nor epoxy groups. Monomers b), or to be more precise the homopolymers of the monomers b), have a glass transition temperature of above 0° C., preferably above 15° C.

The glass transition temperature of the polymer can be determined by customary methods, such as differential thermal analysis or differential scanning calorimetry (see e.g. ASTM 3418/82, at midpoint temperature).

Examples of monomers b) are $C_1$–$C_{20}$-alkyl (meth)acrylates, vinyl. esters of carboxylic acids containing up to 20 carbon atoms, vinylaromatic compounds with up to 20 carbon atoms, ethylenically unsaturated nitriles, and vinyl halides, provided they have the glass transition temperature specified above.

Particularly suitable alkyl (meth)acrylates are methyl methacrylate, methyl acrylate, n-butyl methacrylate and tert-butyl acrylate.

Methyl acrylate, methyl methacrylate and butyl methacrylate are preferred.

Examples of vinyl esters of $C_1$–$C_{20}$ carboxylic acids are vinyl laurate, stearate, propionate, the vinyl ester of Versatic acid and vinyl acetate.

Suitable vinylaromatic compounds are vinyltoluene, α- and p-methylstyrene, α-butylstyrene, 4-n-butylstyrene, 4-n-decylstyrene and, preferably, styrene. Examples of nitriles are acrylonitrile and methacrylonitrile.

Vinyl halides are ethylenically unsaturated compounds substituted by chlorine, fluorine or bromine, and are preferably vinyl chloride and vinylidene chloride.

Preferred monomers (b) are methyl (meth)acrylates and styrene.

Monomers c) are, for example, ethylenically unsaturated monomers having carboxyl groups, such as (meth)acrylic acid, maleic acid, ethylenically unsaturated acid anhydrides or monoesters, such as maleic anhydride or maleic or fumaric monoesters. Acrylic and methacrylic acid are preferred. The content of monomers c) is preferably not more than 5% by weight, based on the polymer. Further monomers d) can be of any kind. Preferred examples which may be mentioned are $C_1$–$C_{10}$-hydroxyalkyl (meth)acrylates or monomers listed under b) which have a glass transition temperature of less than 0° C.

The polymer of the invention consists preferably of

| from 65 to 90 | % by weight of monomers a) |
| from 5 to 25 | % by weight of monomers b) |
| from 0 to 5 | % by weight of monomers c) |
| from 0 to 10 | % by weight of monomers d) | and with particular preference of

| from 70 to 89.9 | % by weight of monomers a) |
| from 10 to 20 | % by weight of monomers b) |
| from 0.1 to 3 | % by weight of monomers c) |
| from 0 to 10 | % by weight of monomers d) |

The glass transition temperature of the polymer is preferably from −60° C. to +10° C., more preferably from −50° C. to −10° C. and, with very particular preference, from −40° C. to −20° C.

The polymer is preferably prepared by emulsion polymerization and is therefore an emulsion polymer.

In emulsion polymerization it is common to use ionic and/or nonionic emulsifiers and/or protective colloids, or stabilizers, as surface-active compounds.

In the present case use is made in accordance with the invention of an emulsifier consisting to the extent of at least 5% by weight of aromatic carbon atoms (and called aromatic emulsifier for short) or an emulsifier mixture which comprises at least 10% by weight of such an aromatic emulsifier, based on the overall amount of emulsifier.

The aromatic emulsifier preferably consists to the extent of at least 10% by weight and more preferably at least 20% by weight of aromatic carbon atoms (by which are meant carbon atoms that are part of an aromatic ring system).

The proportion of aromatic carbon atoms is generally below 80% by weight.

The aromatic emulsifier is preferably an ionic emulsifier, especially one having one or two, preferably two, sulfate groups.

The molar weight of the emulsifier is preferably less than 2000 and especially less than 1000 g/mol.

With particular preference, the aromatic emulsifier comprises an ionic compound having a molecular weight of less than 2000 g/mol and comprising at least one sulfate group or sulfonate groups, preferably two sulfate groups or sulfonate groups with two unsubstituted or substituted phenyl groups.

Preference is given to aromatic emulsifiers having one or two, preferably two, sulfonate groups.

The emulsifier particularly preferably comprises a compound of the formula

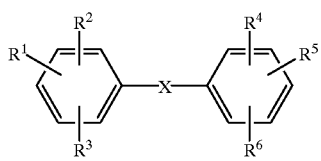

I where X is O, S, $CH_2$, NH or $NR^7$, one or two of $R^1$ to $R^6$ are $SO_3^{\ominus}$ $K^{\oplus}$ and the others of $R^1$ to $R^6$ are H or $C_1$–$C_{18}$-alkyl, $R^7$ is $C_1$–$C_{18}$-alkyl and K is a countercation.

X is preferably O. Preferably, one or two of $R^1$ to $R^6$ are $C_1$–$C_{18}$-alkyl, especially $C_6$–$C_{18}$-alkyl, and the others of $R^1$ to $R^6$ are hydrogen atoms and the sulfonate groups.

K is preferably a countercation selected, for example, from the alkali metals, ammonium and hydrogen. Sodium is particularly preferred. Compounds of the formula I normally also comprise a mixture of compounds having different degrees of substitution (mono- or dialkylated) and different positions of the substituents (i.e. of the sulfonate groups and of the one or two alkyl groups). Compounds of the formula I are marketed under the tradename Dowfax® 2A1 by Dow Chemical Company.

Relative to the use of an aromatic emulsifier alone, the use of a mixture comprising an aromatic emulsifier and an emulsifier without aromatic carbon atoms (nonaromatic emulsifier) is preferred.

The nonaromatic emulsifier is preferably of the formula

II where:

$R^8$ is $C_1$–$C_{18}$-alkyl, preferably $C_{10}$–$C_{16}$-alkyl,

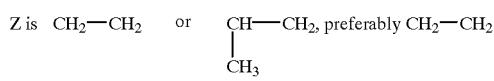

n is an integer from 1 to 40, preferably from 2 to 30, and $K^+$ is a cation, e.g. $H^+$, an alkali metal cation of e.g. Na or K, or ammonium.

Compounds of the formula II are intended to embrace compounds comprising both

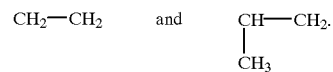

Compounds of the formula II are marketed, for example, under the designation Disponil® FES 77 by Henkel.

The emulsifier mixture consists preferably of

| from 20 to 95% by weight of | an aromatic emulsifier, especially that of the formula I, and |
| from 5 to 80% by weight of | a nonaromatic emulsifier, especially that of the formula II. |

The proportion of the aromatic emulsifier is preferably from 30 to 95% by weight and that of the nonaromatic emulsifier from 5 to 70% by weight, the weight percentages being based on the overall amount of the emulsifiers.

The emulsifier or emulsifier mixture is normally used in amounts of from 0.1 to 15% by weight, preferably from 0.3 to 5% by weight and, with particular preference, from 0.5 to 3% by weight, based on the monomers to be polymerized. Accordingly, the resulting polymer dispersion includes the stated amounts of emulsifier.

Examples of water-soluble initiators for the emulsion polymerization are ammonium salts and alkali metal salts of peroxodisulfuric acid, such as sodium peroxodisulfate, hydrogen peroxide, or organic peroxides, such as tert-butyl hydroperoxide.

Particular suitability is possessed by what are known as reduction/oxidation (redox) initiator systems.

The redox initiator systems consist of at least one reducing agent, which is usually inorganic, and one inorganic or organic oxidizing agent.

The oxidizing component comprises, for example, the abovementioned emulsion polymerization initiators.

Reducing components comprise, for example, alkali metal salts of sulfurous acid, such as sodium sulfite, sodium hydrogen sulfite, alkali metal salts of disulfurous acid, such as sodium disulfite, bisulfite adducts with aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to exist in a plurality of valence states.

Examples of customary redox initiator systems are ascorbic acid/iron(II) sulfate/sodium peroxodisulfate, tert-butyl hydroperoxide/sodium disulfite, tert-butyl hydroperoxide/sodium hydroxymethanesulfinate. The individual components, such as the reducing component, can also comprise mixtures; for example, a mixture of sodium hydroxymethanesulfinate and sodium disulfite.

Said compounds are generally employed in the form of aqueous solutions, the lower concentration being determined by the amount of water which is acceptable in the dispersion and the upper concentration by the solubility of the relevant compound in water. The concentration is generally from 0.1 to 30% by weight, preferably from 0.5 to 20% by weight and, with particular preference, from 1.0 to 10% by weight, based on the solution.

The amount of the initiators is generally from 0.1 to 10% by weight, preferably from 0.5 to 5% by weight, based on the monomers to be polymerized. It is also possible to use two or more different initiators in the course of the emulsion polymerization.

Regulators as well can also be employed for the polymerization, and reduce the molecular mass. Examples of suitable compounds are those having a thiol group, such as tert-butyl mercaptan, ethylhexyl thioglycolate, mercaptoethanol, mercaptopropyltrimethoxysilane or tert-dodecyl mercaptan. The proportion of these regulators can in particular be from 0 to 0.3% by weight, preferably from 0.02 to 0.3% by weight, based on the polymer.

The emulsion polymerization is generally carried out at from 30 to 100° C., preferably from 50 to 95° C. The polymerization medium can consist either of water alone or of mixtures of water with water-miscible liquids such as methanol. Use is preferably made of water alone. The emulsion polymerization can be conducted either as a batch process or in the form of a feed process, including staged or gradient procedures. Preference is given to the feed process, in which a portion of the polymerization mixture is introduced as initial charge, heated to the polymerization temperature and initially polymerized, and then the remainder of the polymerization mixture is supplied to the polymerization zone continuously, in stages or under a concentration gradient and normally by way of two or more spatially separate feed streams of which one or more comprise the monomers in pure or in emulsified form, this supply taking place with the polymerization being maintained.

The manner in which the initiator is added to the polymerization vessel in the course of free-radical aqueous emulsion polymerization is known to the skilled worker. It can either be introduced entirely in the initial charge to the polymerization vessel or else inserted continuously or in stages at the rate at which it is consumed in the course of the free-radical aqueous emulsion polymerization. In each individual case it will depend in a manner known to the skilled worker both on the chemical nature of the initiator system and on the polymerization temperature. It is preferred to introduce one portion in the initial charge and to supply the remainder to the polymerization zone at the rate at which it is consumed.

In order to remove the residual monomers it is also customary, following the end of the actual emulsion polymerization, i.e. after a monomer conversion of at least 95%, to add initiator.

In the case of the feed process, the individual components can be added to the reactor from above, through the side or from below, through the reactor floor.

The emulsion polymerization gives aqueous dispersions of the polymer, generally having solids contents of from 15 to 75% by weight and, preferably, from 40 to 75% by weight.

For a high space/time yield of the reactor, dispersions having a very high solids content are preferred. In order to be able to obtain solids contents >60% by weight it is advisable to establish a bimodal or polymodal particle size, since otherwise the viscosity becomes too high and the dispersion can no longer be handled. Producing a new generation of particles can be carried out, for example, by adding seed (EP 81083), by adding excess emulsifier, or by adding miniemulsions. A further advantage associated with the low viscosity at high solids content is the improved coating behavior at high solids contents. The production of (a) new particle generation(s) can be made at any desired point in time. It is guided by the target particle-size distribution for low viscosity.

The resulting polymers or polymer dispersions are used as pressure-sensitive adhesives. They are particularly suitable as PSAs for labels or adhesive tapes.

The polymers are preferably used in the form of their aqueous dispersion. The aqueous polymer dispersions can be used as pressure-sensitive adhesives without further additives.

In the case of use as pressure-sensitive adhesive it is possible to add to the polymers or to the aqueous polymer dispersions a tackifier, i.e. a tackifying resin. Tackifiers are known, for example, from Adhesives Age, July 1987, pages 19–23 or Polym. Mater. Sci. Eng. 61 (1989), pages 588–592.

Examples of tackifiers are natural resins, such as rosins and their derivatives by disproportionation or isomerization, polymerization, dimerization and/or hydrogenation. They can be in their salt form (with, for example, mono- or polyvalent counterions (cations)) or, preferably, in their esterified form. Alcohols used for esterification can be mono- or polyhydric. Examples are methanol, ethanediol, diethylene glycol, triethylene glycol, 1,2,3-propanetriol and pentaerythritol.

Also used, furthermore, are hydrocarbon resins, examples being indene-coumarone resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene, vinyltoluene.

Further compounds increasingly being used as tackifiers are polyacrylates of low molar weight. These polyacrylates preferably have a weight-average molecular weight $M_W$ of less than 30,000. The polyacrylates consist preferably to the extent of at least 60% by weight, in particular at least 80% by weight, of $C_1$–$C_8$-alkyl (meth)acrylates.

Preferred tackifiers are naturally occurring or chemically modified rosins. Rosins consist predominantly of abietic acid or its derivatives.

The tackifiers can be added in a simple manner to the polymers of the invention, preferably to the aqueous dispersions of the polymers. The tackifiers are preferably themselves in the form of an aqueous dispersion in this case.

The proportion of the tackifiers is preferably from 5 to 100 parts by weight, with particular preference 10 to 50 parts by weight, based on 100 parts by weight of polymer (solids/solids).

In addition to tackifiers it is also possible for other additives, such as thickeners, antifoams, plasticizers, pigments, wetting agents or fillers, to be employed in the case of utility as a pressure-sensitive adhesive. The pressure-sensitive adhesives of the invention may therefore also comprise not only the aqueous polymer dispersion but also tackifiers and/or the above additives.

The pressure-sensitive adhesives can be applied by customary methods, such as by rolling, knifecoating, brushing, etc., to substrates, examples being paper or polymer films consisting preferably of polyethylene, polypropylene, which can be biaxiaLly or monoaxially oriented, polyethylene terephthalate, polyvinyl chloride, polystyrene, polyamide or metal. The water can be removed preferably by drying at from 50 to 150° C. For subsequent use, the PSA-coated side of the substrates, e.g. the labels, can be covered with a release paper, such as with a siliconized paper.

When used as adhesives the polymers of the invention exhibit improved adhesion and cohesion and/or an improved adhesion/ cohesion ratio.

EXAMPLES

A) Test Methods a) Preparing the Test Strips

The test dispersion is applied to siliconized paper in a thin film, using a coating bar, and is dried at 90° C. for 3 minutes. The gap height of the coating bar is chosen so that the weight per unit area of the dried adhesives is 19–21 g/m$^2$. A commercially customary OPP film (30 $\mu$, corona-pretreated) is placed on the dried adhesive and rolled on firmly using a manual roller. The resulting film laminate is cut into 0.5 inch strips 2 cm wide. Prior to testing, these strips are stored under standard atmospheric conditions for at least 24 h.

b) Testing the Shear Strength as a Measure of the Cohesion (in accordance with FINAT FTM 7)

After the siliconized paper has been peeled off, the film test strip is bonded to the edge of a stainless steel sheet so as to give a bond area of 0.5 inch×0.5 inch. 20 minutes after bonding, a 1000 g weight is fastened to the protruding end of the film strip, and the metal sheet is suspended vertically. Ambient conditions: 23° C., 50% relative humidity. The shear strength is taken as the time, in minutes, until the adhesive bond fails under the influence of the weight, as the mean from the results of three test specimens.

c) Testing the Peel Strength as a Measure of the Adhesion (in accordance with FINAT FTM 1)

After the siliconized paper has been peeled off, a film strip 2 cm wide is bonded to a stainless steel sheet. Ambient conditions: 23° C., 50% relative humidity. 1 minute after bonding, the strip is peeled off at an angle of 180° and at a rate of 300 mm/min with the aid of a tensile testing apparatus. The peel strength is taken as the force, in N/2 cm, required to do this, again as a mean from the results of three test specimens.

B) Preparing the Dispersions:

In a polymerization reactor, 116 g of water and 0.05 percent by weight, based on monomers, of a styrene dispersion having a weight-average particle diameter of 30 nm are heated with stirring to 85° C., and then stirring is continued while a portion—10% by weight—of feed stream 2 is added. After 5 minutes, feed stream 1 and the remainder of feed stream 2 are started simultaneously and are metered in at constant rate over 180 minutes. After the end of feed stream 1, stirring is continued at 85° C. for 30 minutes. At this temperature, and still with stirring, 0.1% by weight, based on monomers, of a 10% strength solution of tert-butyl hydroperoxide in water is metered in concurrently with 0.16% by weight, based on monomers, of an aqueous solution of sodium disulfite-acetone adduct. The dispersion is then cooled to room temperature and neutralized to pH=7 with 15% strength aqueous NaOH. The solids content of the dispersion is adjusted to 55–57%.

The following abbreviations have been used:

| | |
|---|---|
| EA | ethyl acrylate |
| HA | n-hexyl acrylate |
| BA | n-butyl acrylate |
| EHA | 2-ethylhexyl acrylate |
| MMA | methyl methacrylate |
| AA | acrylic acid |
| tDMK | tert-dodecyl mercaptan |
| Disponil FES77 | 30% strength by weight aqueous solution of the sodium salt of the sulfuric monoester of a $C_{12}$—$C_{14}$-alkyl ethoxylated with 30 ethylene oxide units (see formula II) |
| Dowfax 2A1 | 45% strength by weight aqueous solution of the sodium salt of diphenyl ether derivatized with a $C_{12}$—$C_{14}$-alkyl radical and with two $SO_3K$ radicals (see formula I) |
| Steinapol NLS | 45% strength aqueous solution of the sodium salt of lauryl sulfate |
| NaPS | sodium peroxodisulfate |

Feed stream 1=emulsion feed stream:

242 g of water 0.05% by weight of tDMK, based on monomers

Total amount of monomers: 560 g

Nature of the monomers: see Table

Nature and amount of the emulsifiers: see Table

Feed stream 2=Initiator feed stream:

Amount of NaPS (7% strength): see Table

The composition and test results are set out in Table 1.

TABLE 1

| | Monomer mixture** + in each case 1 AA | Emulsifier*** | Peel strength [N/2 cm] | Shear strength |
|---|---|---|---|---|
| 1 | EHA:70<br>BA:14<br>MMA:15 | 0.3 Disponil FES77<br>0.4 Dowfax 2A1 | 7.4 | 51 |
| 2* | EHA:84<br>MMA:15 | 0.3 Disponil FES77<br>0.4 Dowfax 2A1 | 5.4 | 33 |
| 3* | EHA:80<br>EA:4<br>MMA:15 | 0.3 Disponil FES77<br>0.4 Dowfax 2A1 | 4.6 | 13 |

TABLE 1-continued

| Monomer mixture** + in each case 1 AA | Emulsifier*** | Peel strength [N/2 cm] | Shear strength |
|---|---|---|---|
| 4* EHA:70<br>BA:14<br>MMA:15 | 1.0 Disponil FES 77<br>0.2 Steinapol NLS | 4.1 | 25 |
| 5* EHA:84<br>MMA:15 | 1.0 Disponil FES 77<br>0.2 Steinapol NLS | 4.8 | <1 |
| 6* EHA:65<br>EA:19<br>MMA:15 | 0.3 Disponil FES 77<br>0.4 Dowfax 2A1 | 4.0 | 13 |
| 7* BA:65<br>EA:19<br>MMA:15 | 0.3 Disponil FES 77<br>0.4 Dowfax 2A1 | 3.3 | 44 |
| 8* EHA:91<br>MMA:8 | 0.3 Disponil FES 77<br>0.4 Dowfax 2A1 | 3.3 | 9 |
| 9* BA:91<br>MMA:8 | 0.3 Disponil FES 77<br>0.4 Dowfax 2A1 | 4.0 | 47 |
| 10* EHA:65<br>EA:9<br>MMA:25 | 0.3 Disponil FES 77<br>0.4 Dowfax 2A1 | 3.0 | 97 |
| 11* BA:65<br>EA:9<br>MMA:25 | 0.3 Disponil FES 77<br>0.4 Dowfax 2A1 | 2.9 | 177 |
| 12* HA:84<br>MMA:15 | 0.3 Disponil FES 77<br>0.4 Dowfax | 2.8 | 102 |

*for comparison
**figures in percent by weight
***parts by weight per 100 parts by weight of monomers

We claim:
1. A pressure-sensitive adhesive comprising an aqeuous polymer dispersion wherein the polymer comprises

| | |
|---|---|
| from 60 to 95% by weight | of a mixture comprising at least one $C_4$-alkyl acrylate and at least one $C_6$–$C_{12}$-alkyl acrylate (monomers a), |
| from 5 to 30% by weight | of ethylenically unsaturated compounds, the homopolymer of which has a glass transition temperature of above 0° C. and containing no functional groups other than the ethylenically unsaturated group (monomers b), |
| from 0 to 10% by weight | of ethylenically unsaturated compounds having at least one acid group or acid anhydride group (monomers c), |
| from 0 to 20% by weight | of further ethylenically unsaturated compounds (monomers d), | the weight percentages being based on the polymer and the polymer dispersion comprising an emulsifier having at least 5% by weight of aromatic carbon atoms (and called aromatic emulsifier for short) or an emulsifier mixture having at least 10% by weight of an aromatic emulsifier.

2. An adhesive as claimed in claim 1, wherein monomers a) comprise from 15 to 85% by weight of $C_4$-alkylacrylate and
from 15 to 85% by weight of $C_6$- to $C_{12}$-alkyl acrylates.

3. An adhesive as claimed in claim 1, wherein monomers a) comprise a mixture of n-butyl acrylate and 2-ethylhexyl acrylate.

4. An adhesive as claimed in claim 1, wherein monomers b) comprise methyl methacrylate or styrene.

5. An adhesive as claimed in claim 1, wherein the polymer is composed of

| | |
|---|---|
| from 70 to 89.9 | % by weight of monomers a) |
| from 10 to 20 | % by weight of monomers b) |
| from 0.1 to 3 | % by weight of monomers c) and |
| from 0 to 10 | % by weight of monomers d). |

6. An adhesive as claimed in claim 1, wherein the aromatic emulsifier comprises an ionic compound having a molecular weight of less than 1000 g/mol and comprising at least one sulfate group or sulfonate group and two unsubstituted or substituted phenyl groups.

7. An adhesive as claimed in claim 6, wherein the aromatic emulsifier comprises a compound of the formula

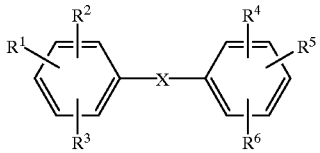

I where X is O, S, $CH_2$, NH or $NR^7$, one or two of $R^1$ to $R^6$ are $SO_3^-$ $K^+$ and the others of $R^1$ to $R^6$ are H or $C_1$–$C_{18}$-alkyl, $R^7$ is $C_1$–$C_8$-alkyl and K is a countercation.

8. An adhesive as claimed in claim 1, wherein the emulsifier comprises an emulsifier mixture comprising from 20 to 95% by weight of an aromatic emulsifier and
from 5 to 80% by weight of a sulfate of the formula

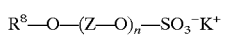

II where:

$R^8$: is $C_1$–$C_{18}$-alkyl

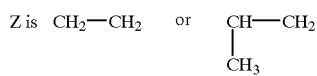

n is an integer from 1 to 40 and k is a cation.

9. An adhesive tape or label coated with a pressure-sensitive adhesive as claimed in claim 1.

10. An aqueous polymer dispersion comprising a polymer comprising

| | |
|---|---|
| from 70 to 89.9% by weight [of monomers a)] | of a mixture comprising at least one $C_4$-alkyl acrylate and at least one $C_6$–$C_{12}$-alkyl acrylate (monomers a). |
| from 10 to 20% by weight [of monomers b)] | of ethylenically unsaturated compounds the homopolymer of which has a glass transition temperature of above 0° C. and containing no functional groups other than the ethylenically unsaturated group (monomers b). |
| from 0.1 to 3% by weight [of monomers c)] | of ethylenically unsaturated compounds having at least one acid group or acid anhydride group (monomers c). |
| from 0 to 10% by weight [of monomers d)] | of further ethylenically unsaturated compounds (monomers d). | and an emulsifier having at least 5% by weight of aromatic carbon atoms (and called aromatic emulsifier for short) or an emulsifier mixture having at least 10% by weight of an aromatic emulsifier.

* * * * *